B. PICKERING.
TRAP.
APPLICATION FILED FEB. 11, 1916.
1,217,056.
Patented Feb. 20, 1917.
3 SHEETS—SHEET 2.
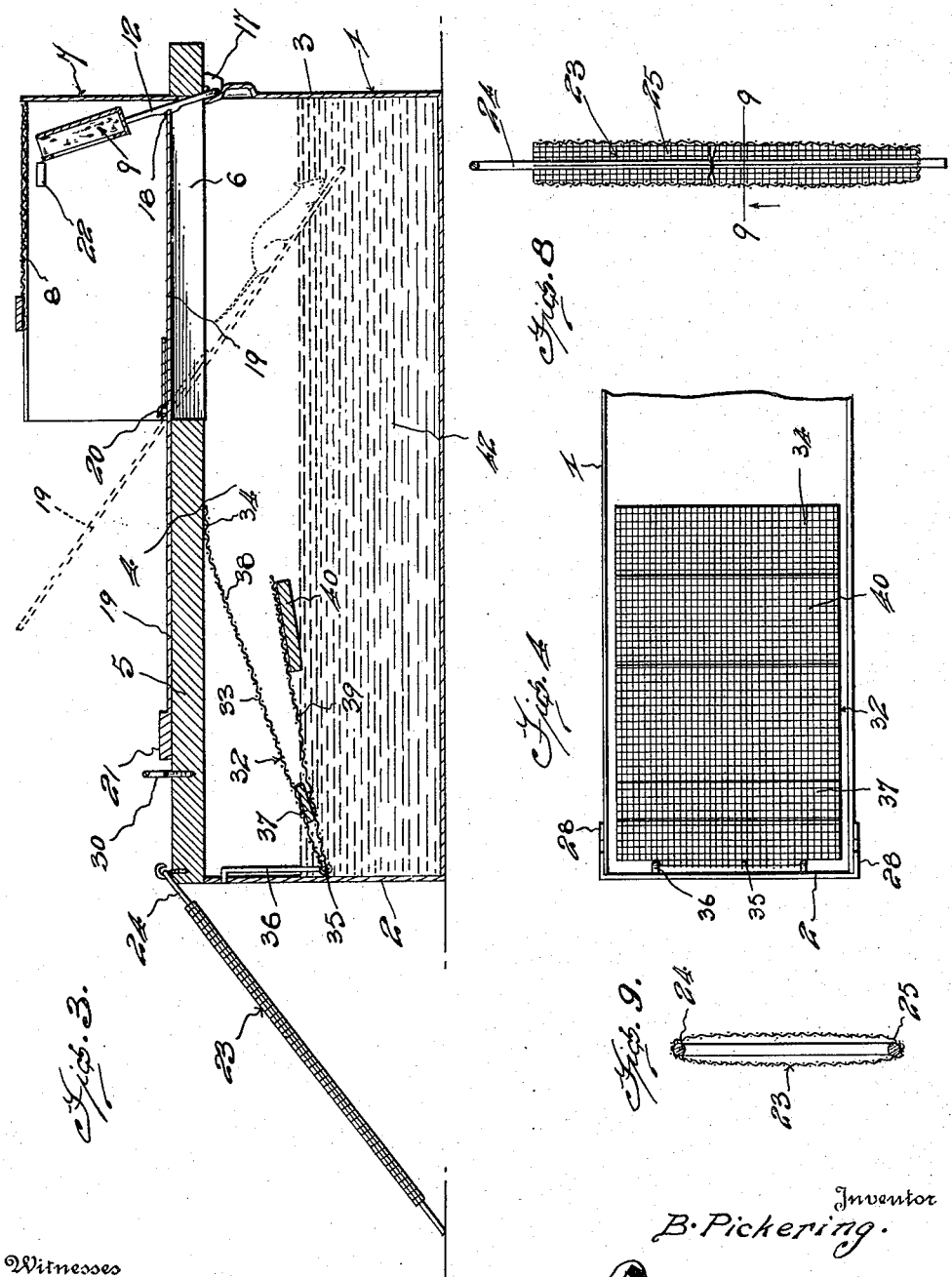
Witnesses
Inventor
B. Pickering.
By 
Attorney

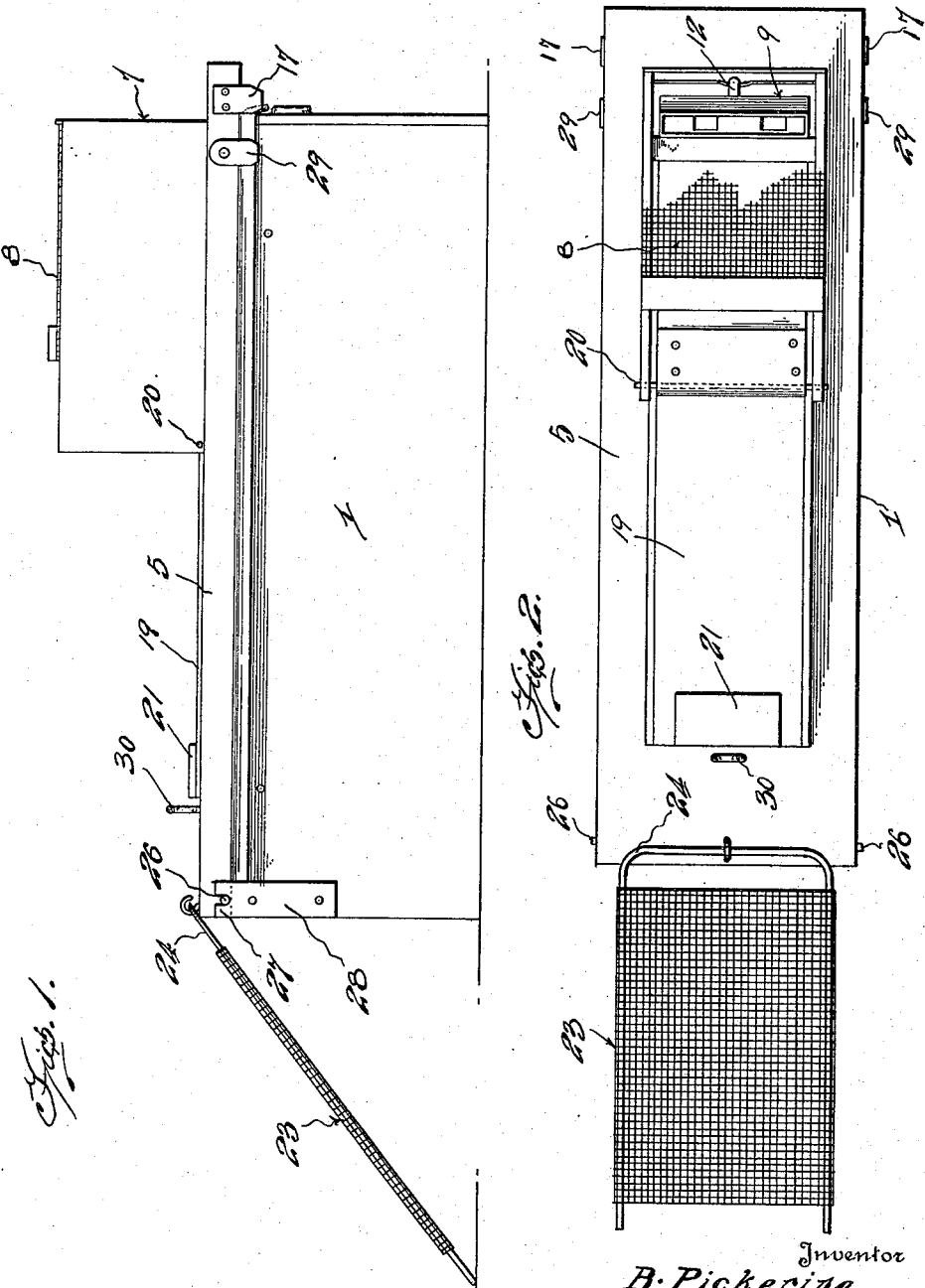

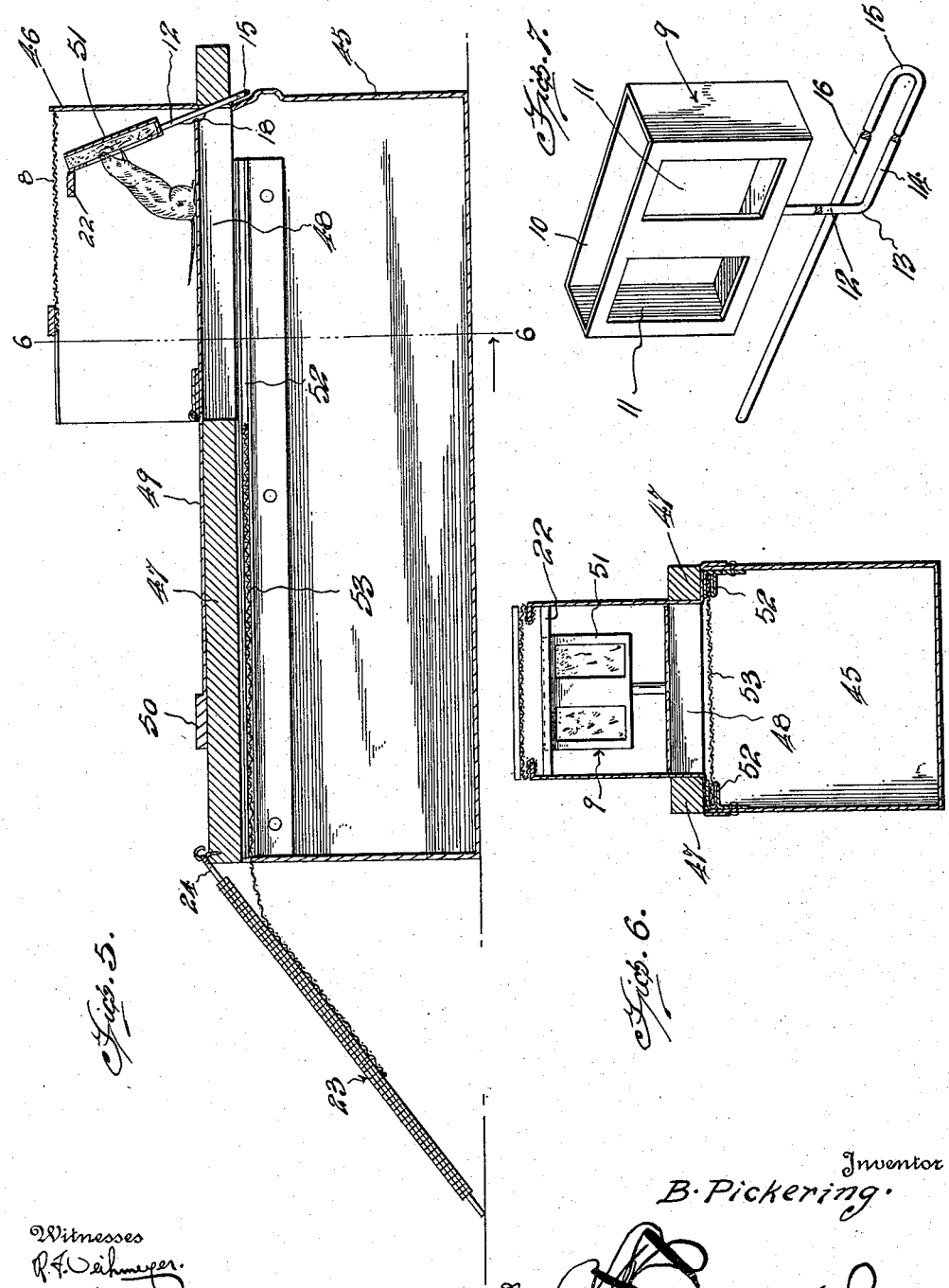

UNITED STATES PATENT OFFICE.

BYRON PICKERING, OF KISSIMMEE, FLORIDA.

TRAP.

1,217,056. Specification of Letters Patent. Patented Feb. 20, 1917.

Application filed February 11, 1916. Serial No. 77,686.

*To all whom it may concern:*

Be it known that I, BYRON PICKERING, a citizen of the United States, residing at Kissimmee, in the county of Osceola and State of Florida, have invented certain new and useful Improvements in Traps; and I do hereby declare the following to be a full, clear, and exact description of the invention, such as will enable others skilled in the art to which it appertains to make and use the same.

This invention relates to a trap which is designed for catching rats, mice, or various other types of rodents, and the primary object of the invention is to provide a trap of this nature which is simple in construction, durable and efficient in its operation and further a trap which automatically sets itself, after it has been operated by the rodent.

A further object of this invention is to provide a trap as specified which includes a liquid retaining tank having a portion of its upper surface open and to provide a pivotally mounted door which forms a tread over which the rodent travels to the bait, and further to provide bait carrying means which controls the movement of the pivoted tread, preventing pivotal movement of the tread except under agitation of the bait carrying member.

Another object of this invention is to provide a drowning structure which is positioned interiorly of the tank and will efficiently assist in the drowning of the rodent.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved trap.

Fig. 2 is a top plan view of the trap.

Fig. 3 is a vertical longitudinal section through the trap.

Fig. 4 is a plan view illustrating the drowner.

Fig. 5 is a longitudinal section through a modified form of the trap.

Fig. 6 is a cross section on the line 6—6 of Fig. 5.

Fig. 7 is a detail perspective view of the bait carrying member.

Fig. 8 is a detail view of the approach to the trap, and

Fig. 9 is a section on line 9—9 of Fig. 8.

Referring more particularly to the drawings, 1 designates the liquid receiving tank as an entirety, which has ends 2 and 3, and upstanding sides 4. The top of the tank 1 is opened normally and it is closed by a plate 5 which may be constructed of wood or analogous material and rests upon the upper edges of the sides and ends of the tank. The plate 5 is provided with an opening 6 extending therethrough which communicates with the interior of the tank 1, and with the interior of an auxiliary box 7 which is mounted above the opening as clearly shown in Figs. 1 and 3 of the drawings. The forward end of the box 7 is open and the sides and rear end of the box are attached to the plate 5 in any suitable manner. The top of the box 7 is closed by a slidable foraminous door 8.

Positioned interiorly of the box 7 is a vibratory bait carrying member generically indicated by the numeral 9, which bait member comprises a rectangular casing 10 which is provided with openings 11 in its forward surface to permit the rodent to gain access to the bait which is contained within the receptacle 10. A rod 12 is connected to the bottom of the receptacle 10 and projects downwardly therefrom being bent as is shown at 13 to provide a horizontally positioned portion 14 and again bent at 15 to provide a horizontal portion 16 which is parallel to the portion 14. The vertical portion 12 of the rod extends downwardly through the opening 6, and a horizontal portion 16 of the rod is pivotally supported by bearings 17 which are attached to and depend from the plate 5. The vertical portion of the rod 12 is provided with a notch 18, which receives a portion of one end of a pivoted tread 19. The tread 19 is pivotally supported by a rod 20 which is carried by the sides of the box 7, and it forms a closure for the opening 6. The portion of the pivoted tread 19 which projects out of the box 7 is weighted as shown at 21, so as to automatically return the tread to its horizontal position after it has been moved as indicated in dotted lines in Fig. 3 of the drawings, by a rodent. The forward movement of the vibratory bait carrying member 9 is limited by a bar 22 carried by the box 7.

An approach 23 is detachably connected to the plate 5, by a bail member 24 of the approach. The approach 23 is composed of the bail member 24 which forms a frame to which a sheet of foraminous material indicated at 25 is attached. The portion of the foraminous sheet 25 which forms the upper and lower surface of the tread are spaced from each other, as clearly shown in Fig. 9 of the drawings to provide a pocket for retaining grain or analogous bait for attracting the rodent. The plate 5 has pins 26 attached thereto and projecting outwardly from the edges of the plate which pins are adapted for seating in sockets 27 formed in plates 28 which plates are carried by the outer surface of the sides 4 of the tank 1. Plates 29 are attached to the edges of the plate 5 adjacent to the end opposite of the end which carries the pins 26. The plates 29 are spaced for engaging the sides of the tank 1 for assisting in the proper positioning of the plate 5 upon the upper surface of the tank.

A catch 30 is carried by the plate 5 and is adapted for engaging the weighted end of the tread 19 for locking the tread against pivotal movement. A drowner structure generically indicated by the numeral 32 is positioned interiorly of the tank or receptacle 1 at the end of the tank oppositely from the end with which the opening 6 communicates. The drowner 32 includes a sheet 33 of foraminous material which has one end secured as is shown at 34 to the under surface of the plate 5. The sheet 33 of foraminous material is bent intermediate its ends and attached to the horizontal portion 35 of a supporting bracket 36, which bracket is carried by the end 2 of the tank 1. A float 37 is attached to the upper portion of the sheet 33 and tends to hold this portion which is indicated by the numeral 38 in an upward position causing the end 34 to engage the under surface of the plate 5. The portion 39 of the foraminous sheet 33 extends inwardly into the tank below the portion 38 and has a float 40 mounted upon the under surface of its outer end.

In the operation of the improved trap; the foraminous tread 23 is preferably coated with cheese or analogous bait to attract the rats and mice, which bait is rubbed into the mesh of the tread so that the mice or rats cannot get the same. This bait will act as an attracter for the mice and draw them to the trap, after which the bait which is carried by the vibratory bait member 9 will further attract them and cause them to mount the approach 23 and pass over the upper surface of the plate 5 and the pivoted tread 19. When the mouse or rat nibbles at the bait which is carried by the receptacle 10 of the vibratory bait member, he will vibrate this bait member which will release the connection between the notch 18 and the edge of the pivoted tread 19 permitting the tread to move downwardly under the weight of the rodent as indicated in dotted lines in Fig. 3 of the drawings. The downward movement of the tread will deposit the rodent into the tank 1 after which the tread will fly back into its normal position under action of the weight 21. In case the rodent swims about within the liquid indicated at 42, which is contained within the tank he will be attracted by the drowner 32 and upon endeavoring to climb upon the section 39, which is normally held out of the liquid by the float 40 will owing to the flexibility of the section 39 move this section downwardly into the liquid.

His efforts upon the drowner will cause the drowner to vibrate and continuously duck the rodent in the liquid until it is drowned. The section 33 of the drowner acts as a top or guard for the section 39 and should the rodent cling to this section, it will also move downwardly under the weight of the rodent into the liquid.

In Figs. 5 and 6 of the drawings, a modified form of the invention is shown, which includes a tank 45 having a box 46 positioned upon its upper end and a plate 47 which is identical to the plate 5. The plate 47 is provided with an opening 48 which is normally closed by a pivoted tread 49, the outer end of which is weighted as is shown at 50. A vibratory bait member 51 is provided for holding the pivoted tread 49 in a normal horizontal position and which is moved under the action of the rodent, nibbling at the bait into a position to permit the tread to fall downwardly. The tank 45 does not have any type of liquid contained therein so that the rodent will merely fall into the tank.

The tank 45 is provided with a pair of guide ways 52 attached to the inner surface of the same, which guides the sliding movement of a foraminous cover or door 53. When the trap is set the foraminous cover 53 is moved into the position as indicated in Fig. 5 of the drawings or the inner edge of the same is moved outwardly from or in alinement with the outer edge of the opening 48 of the plate 47, so as to permit the rodent to fall downwardly into the receptacle 45. When it is desired to remove the rodent from the receptacle, the foraminous cover 53 is moved inwardly so that it will form the complete cover for the receptacle 45 after which the plate 47 is removed and the rodent killed in any desired manner.

In reducing the invention to practice certain minor features of construction, combination and arrangement of parts may necessitate alterations to which the patentee is entitled provided such alterations are comprehended within the scope of what is claimed.

What is claimed is:—

1. In a trap structure, a liquid retaining receptacle, a trap door, a bait retainer, means operatively connected to said bait retainer for controlling the operation of said trap door, a drowner positioned within said liquid retaining receptacle and including a resilient plate having one edge connected to the inner surface of one end of said retaining receptacle, and a float attached to the under surface of the free edge of said drowner for normally holding the free edge of the drowner above the upper surface of the liquid within the tank.

2. In a trap structure, a liquid retaining receptacle, a trap door, a bait retainer, means operatively connected to said bait retainer for controlling the operation of said trap door, a drowner structure positioned within said liquid retaining receptacle and including a plate constructed of foraminous material having one edge attached to the inner surface of one end of said retaining receptacle, a float attached to the under surface of the outer free end of said foraminous plate, a foraminous guard attached to the inner surface of the end of said receptacle and extending upwardly above said drowner and having its upper end attached to the inner surface of the top of said receptacle.

In testimony whereof I affix my signature in presence of two witnesses.

BYRON PICKERING.

Witnesses:
 CORSON FARMER,
 JOHN C. CURD.

Copies of this patent may be obtained for five cents each, by addressing the "Commissioner of Patents, Washington, D. C."